United States Patent [19]
Long et al.

[11] Patent Number: 5,195,399
[45] Date of Patent: Mar. 23, 1993

[54] TRANSMISSION ASSEMBLY

[75] Inventors: Charles F. Long, Indianapolis; Phillip F. McCauley, Zionsville; John D. Slaubaugh, Indianapolis, all of Ind.

[73] Assignee: General Motors Corporation, Detroit, Mich.

[21] Appl. No.: 834,741

[22] Filed: Feb. 13, 1992

[51] Int. Cl.⁵ ............................................. F16H 57/02
[52] U.S. Cl. .................................. 74/606 R; 137/884
[58] Field of Search ..................... 74/606 R, DIG. 1; 29/407; 137/884

[56] References Cited
U.S. PATENT DOCUMENTS 4,083,266  4/1978  Kreitzberg ........................ 74/606 R
4,171,559 10/1979  Vyse et al. ............................. 29/407
4,210,034  7/1980  Younger ........................... 74/606 R
4,226,200 10/1980  Morisawa ......................... 74/606 R
4,805,490  2/1989  Fuehrer et al. ................... 74/606 R Primary Examiner—Richard M. Lorence
Assistant Examiner—Khoi Q. Ta
Attorney, Agent, or Firm—Donald F. Scherer

[57] ABSTRACT

A transmission has alignment and assembly assisting structures for controlling the assembly of a valve body and separator plate with a transmission housing within a family of transmissions. The alignment and assembly assisting structures generally include tabs and locator surfaces, as well as pin locators which prevent a component or subassembly of one family member from being assembled with a different family member.

3 Claims, 5 Drawing Sheets

TRANSMISSION ASSEMBLY

BACKGROUND OF THE INVENTION

This invention relates to transmission assemblies, and more particularly, to structures incorporated within the transmission assembly to prevent the misassembly of various transmission members.

As a general rule, when a family of transmissions is utilized, the differentiation between family members, at assembly, must be accomplished either by visual differences, such as colors, or on final inspection. To determine the incorrect assembly of a family member at final inspection is expensive since it requires the disassembly of the transmission for correction. The use of colored elements to differentiate between family members requires an extra painting and/or dying step to be accomplished and is therefore an increase in cost.

SUMMARY OF THE INVENTION

The present invention provides for the differentiation of family members by incorporating structures within the assembly which will prevent the improper use of a family member within the transmission.

In a family of transmissions, there are generally torque levels at which the various transmission members are designed to operate. For example, a transmission family can have a light duty member, a medium duty member and a heavy duty member. These transmissions would have different clutch structures and/or gear structures to accommodate the various torque transmission levels that would be seen during operation. These transmissions might also have various shift sequences and different pressure levels to be utilized during the operating cycle. However, the family members will each have the same basic gear connection scheme and can, if desired, utilize a gear layout such as that shown in U.S. Pat. No. 4,070,927 to Polak, issued Jan. 31, 1978, and assigned to the assignee of the present invention. Accordingly, the transmission family member might have a distinct casing, a distinct valve body, a distinct separator plate between the valve body and the channel plate and a distinct solenoid valve body, among other structural devices.

The present invention utilizes blocking surfaces on the transmission case which will be interfered with by tabs on the separator plate, should an incorrect separator plate and casing assembly be attempted. The separator plate and the various channel plates and valve bodies are aligned by a pin member, such that proper alignment of the holes through which the pin member extends must be present so that proper assembly can be attained. With the present invention, a transmission family having four members can have separate casings, separator plates, valve bodies and channel plates, which cannot be interassembled due to the required proper alignment of assembly and assisting means which are incorporated within the assembly structure.

It is therefore an object of this invention to provide an improved transmission family, wherein alignment and assembly assisting structures are utilized to prevent the interassembly of family members resulting in an improper transmission assembly.

It is another object of this invention to provide alignment and assisting means within a transmission family, such that teardown and repair at final test will not be required due to improper mechanisms being incorporated into a transmission assembly.

These and other objects and advantages of the present invention will be more apparent from the following description and drawings.

DESCRIPTION OF THE EXEMPLARY EMBODIMENT

Figures 1, 2:
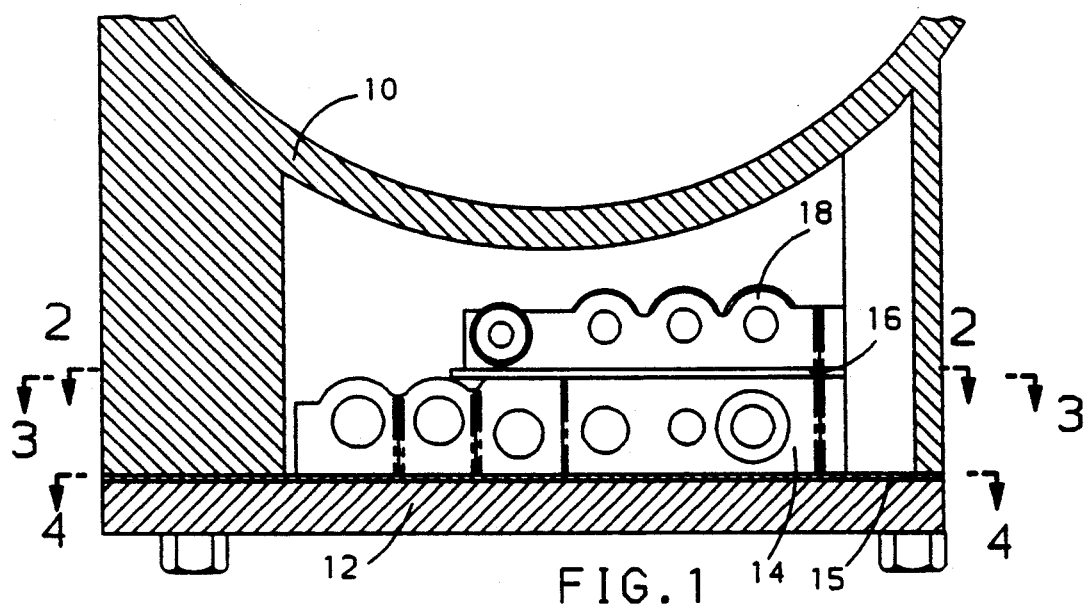
FIG. 1 is a partial sectional elevational view of a transmission incorporating the present invention and showing the position of the various mechanisms within the transmission casing.
FIG. 2 is a view taken along line 2—2 of FIG. 1 and illustrates the blocking surfaces and locating tabs, as well as the pin alignment mechanisms incorporated within the transmission families.

Referring to the drawings, wherein like characters represent the same or corresponding parts throughout the several views, there is seen in FIG. 1 a partial view of a transmission having a housing or casing 10 to which is attached a channel plate 12. The housing 10 and channel plate 12 are substantially conventional devices and, as is well known, the channel plate 12 has incorporated therein a plurality of worm tracks which provide for the distribution of fluid to and from the transmission casing, and also to and from a valve body 14 which is secured to the channel plate 12 and separated therefrom by a channel plate separator 15. The valve body 14 has mounted thereon a solenoid separator plate 16 and a solenoid valve body 18.

The members described thus far are fairly conventional members in that their structures and uses are well known. The valve body 14, for example, is operated to control the various friction devices and pressure levels within the transmission, while the solenoid valve body 18 incorporates a plurality of solenoid valves which establish the shift schedules within the transmission.

As seen in FIG. 2, the casing 10 has a blocking structure or protuberance 20, shown in solid lines, a blocking structure or protuberance 22, shown in solid lines, and a third blocking structure or protuberance 24, shown in phantom line. Positioned within the casing 10 is the solenoid separator plate 16 which has a plurality of blocking tabs 26, 28, shown in phantom line and 30 in solid line. As can be seen in FIG. 2, the tab 26 will interfere with the blocking structure 20, the tab 28 will interfere with the blocking structure 22, and the tab 30 will interfere with the blocking structure 24. Therefore, if the tab 26 is present, the blocking structure 20 cannot be present. This limits the transmission casings in which the separator plate with blocking tab 26 can be used. Obviously, the same is true for the separator plates that incorporate either blocking tab 28 or 30. The solenoid separator plate 16 also has a round aperture 32 and an oblong or oval aperture 34 which is shown in phantom line.

Figure 3:
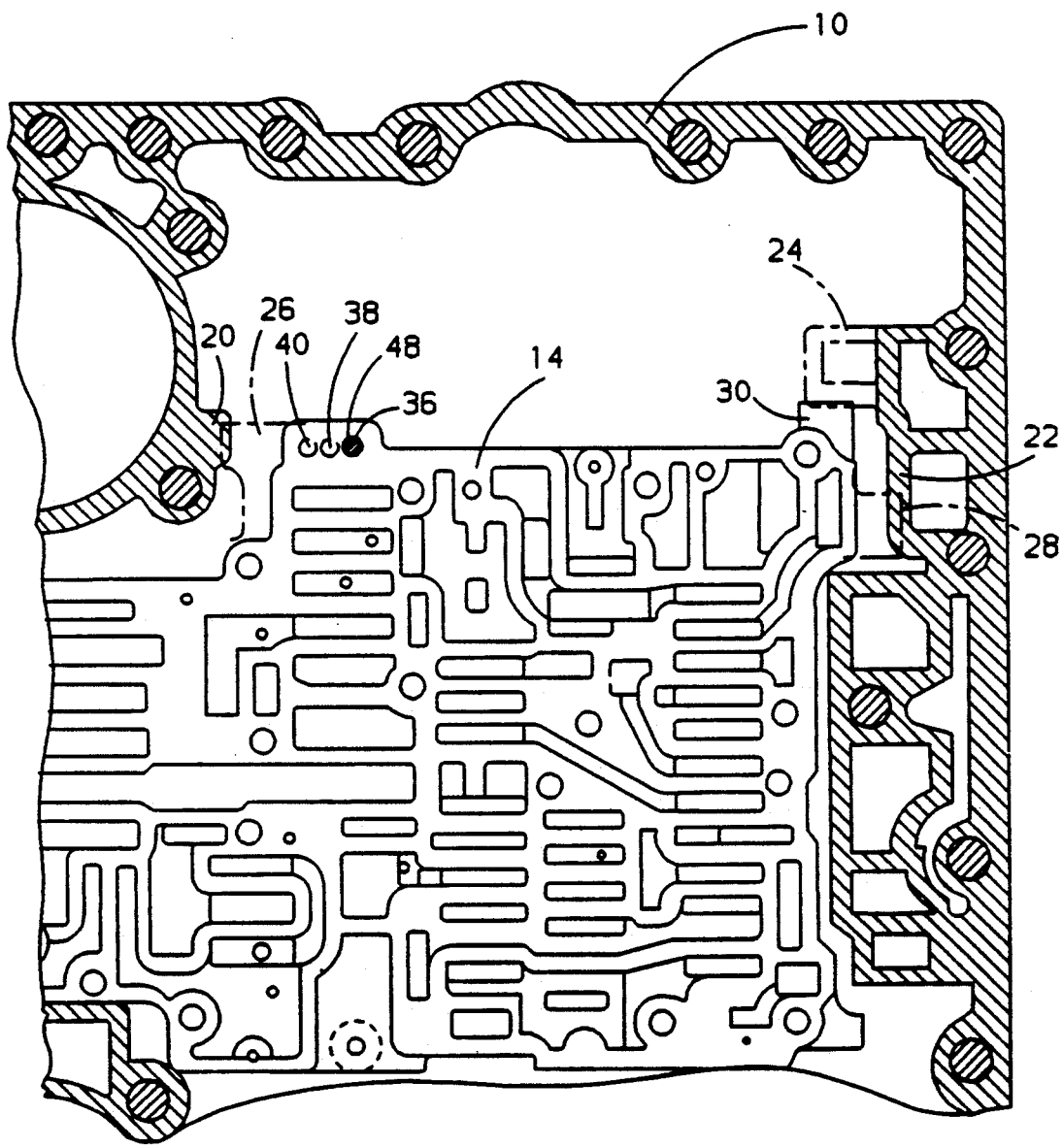
FIG. 3 is a view taken along line 3—3 of FIG. 1 showing the relationship of the valve body of the family members and pin alignment locations.

As seen in FIG. 3, the valve body 14 has three round apertures 36, shown in solid line, and 38 and 40, shown in phantom line. The aperture 36, in the valve body 14, and aperture 32, in the plate 16, are disposed in alignment, while the apertures 38 and 40 are disposed in alignment with the oval or oblong aperture 34.

Figure 4:
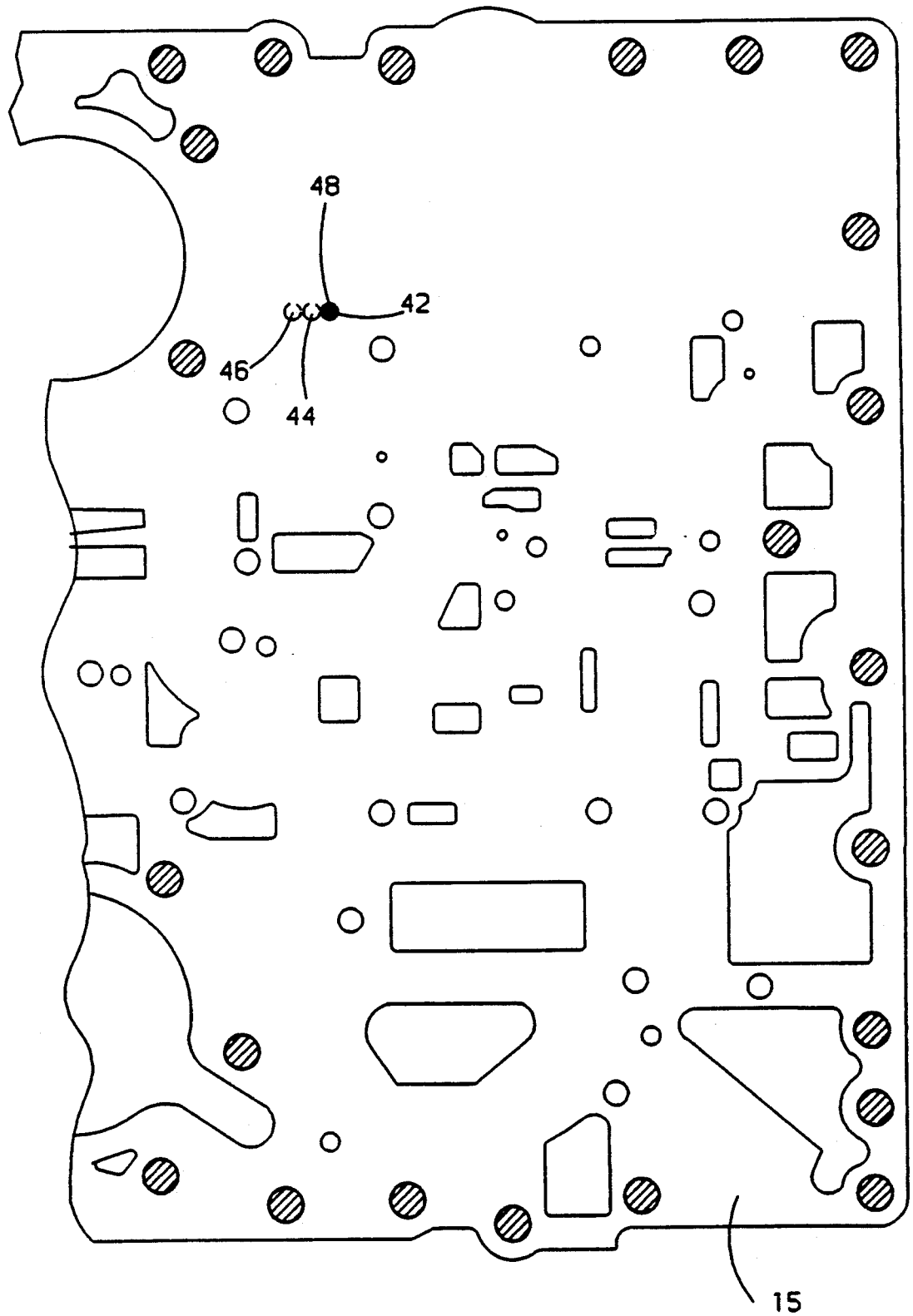
FIG. 4 is a view taken along line 4—4 of FIG. 1 describing the separator plate between the channel plate and valve body.

In FIG. 4, there is seen the outline and various openings of the channel plate separator 15. This plate 15 also has three apertures; namely, 42 shown in solid line, and 44 and 46, shown in phantom line. The aperture 42 (plate separator 15) is aligned with the apertures 36 (valve body 14) and 32 (plate 16), while the aperture 44 is aligned with the aperture 38 and oval aperture 34. The aperture 46 is aligned with the aperture 40 and the oval aperture 34.

The oval aperture 34 is provided in the present invention since two of the assemblies within the family, that is two of the family members utilize the same solenoid separator plate. This permits the pin location to be in either of the apertures 44 or 46 in the channel plate separator 15, and apertures 38 or 40 in the valve body 14. For simplicity, the family members will be labeled A, B, C and D.

Assembly A has the blocking surface 20 and the blocking surface 22 incorporated in the casing 10, and the blocking tab 30 incorporated in the plate 16. Assembly A likewise has apertures 32, 36 and 42 incorporated in their respective plate 16, valve body 14 and channel plate separator 15. Assembly B has blocking tab 28 (plate 16) and blocking structures 20 and 24 (casing 10), as well as apertures 34, 44 and 38. Assembly C has blocking tab 26 (plate 16) and blocking structures 24 and 22 (casing 10), as well as apertures 34, 44 and 38. Assembly D has blocking tab 26, as well as blocking structures 22 and 24. Thus, it can be seen that assemblies C and D utilize the same casing and solenoid separator plate. Assembly D, however, utilizes apertures 34, 40 and 46 which prevents the valve body 14 and channel plate 15 of family member C being utilized in family member D.

Figure 5A:
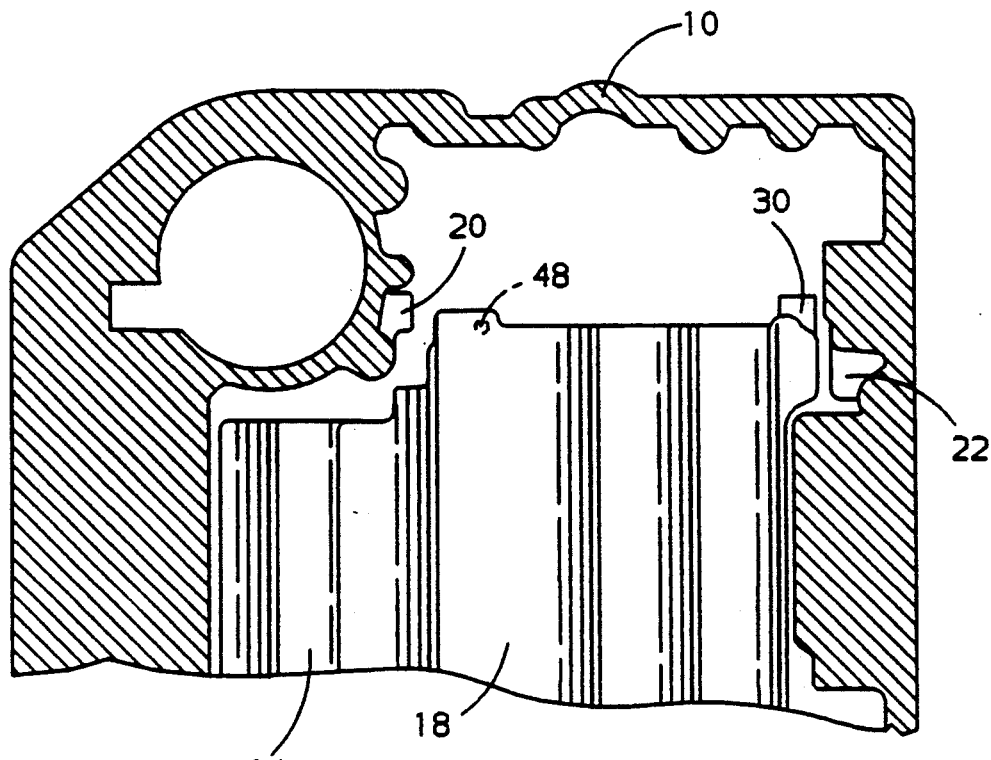
FIGS. 5a through 5d are diagrammatic representations of the assembly of four family members incorporating the alignment and assembly assisting structures of the present invention.
Figure 5B:
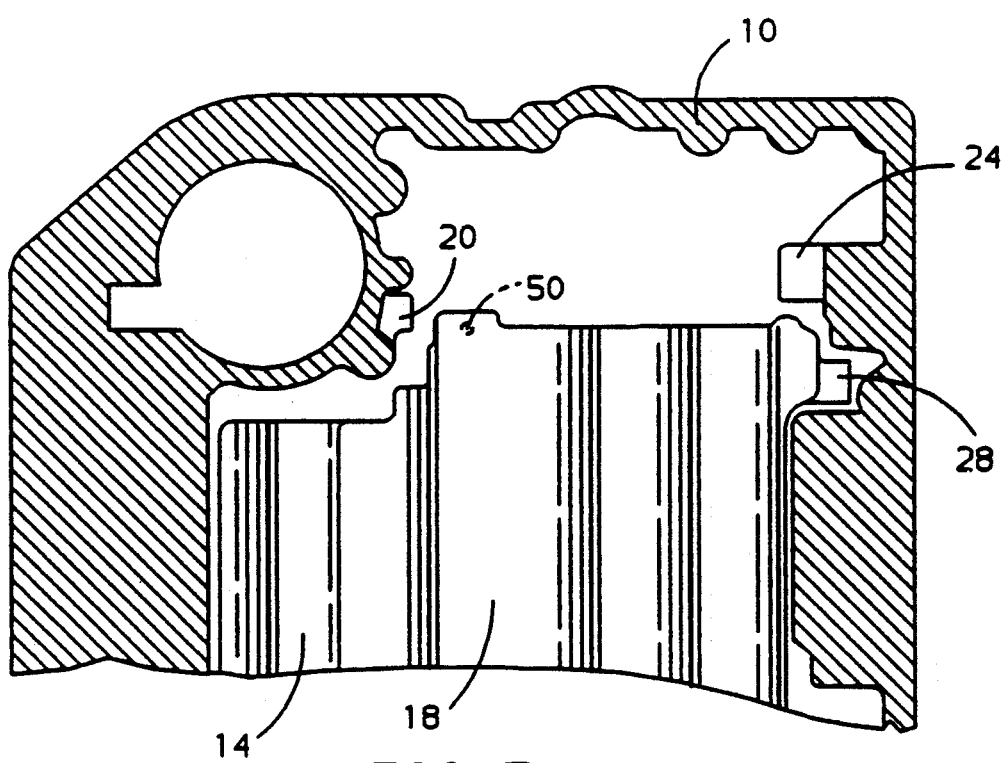
Figure 5C:
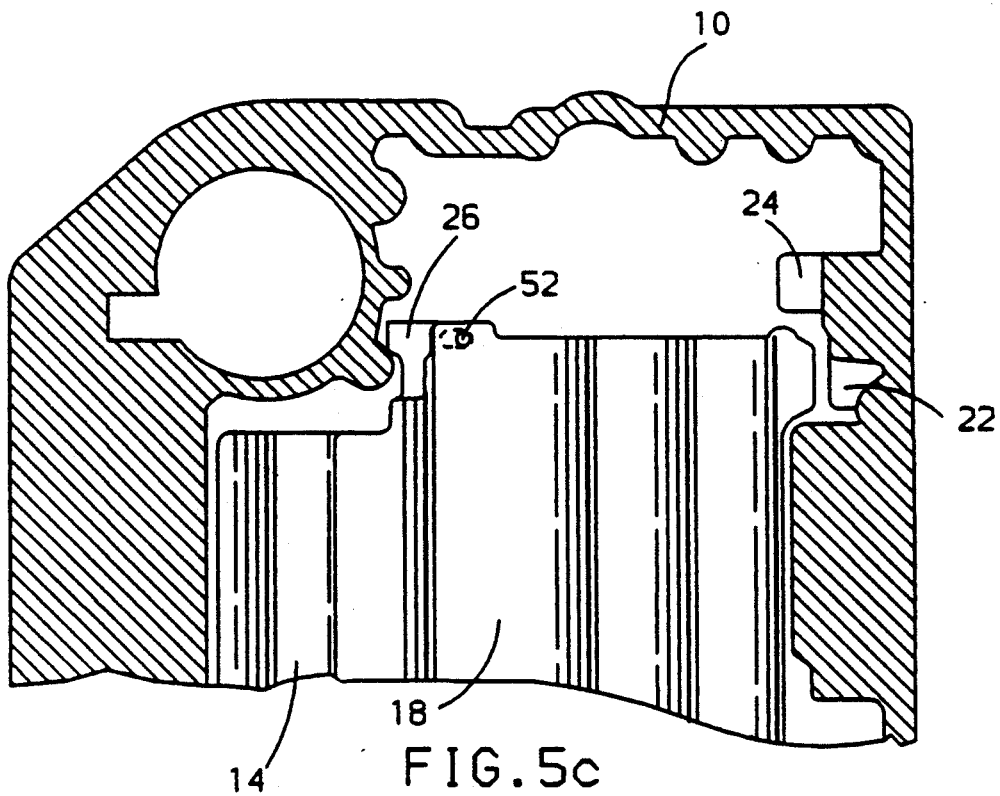
Figure 5D:
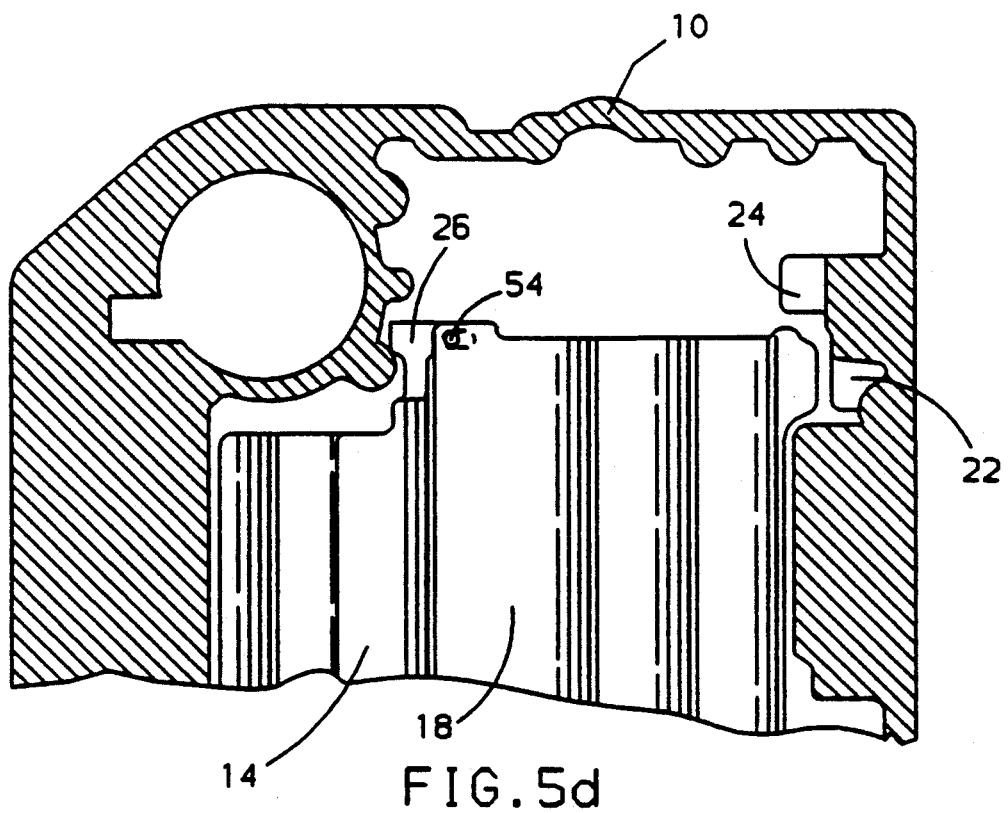

The diagrammatic representations shown in FIGS. 5a through 5d are consistent with the above descriptions. That is, FIG. 5a represents family member A; FIG. 5b represents family member B; FIG. 5c represents family member C; and FIG. 5d represents family member D. A review of FIG. 5a will show that the blocking tab 30 is not interfered with by any surface on the casing 10, and that an alignment pin 48 is disposed in the apertures to the far right.

In FIG. 5b, the blocking tab 28 is present and does not have a blocking surface on the casing 10 to interfere therewith. The apertures through which an alignment pin 50 is disposed are in the center position of the aperture locations, and that is, apertures 34, 38 and 44. FIG. 5c has the blocking tab 26 as does FIG. 5d have the blocking tab 26 without a corresponding surface on the casing 10 to interfere therewith. However, the assembly in 5c incorporates an alignment pin 52 in the center position of the apertures, while the assembly in FIG. 5d incorporates an alignment pin 54 far left aperture position, that is, apertures 40 and 46.

Thus, for the four family members, it is seen that interassembly of the various elements is impossible. While the aperture 34 is described as an oval, it should be appreciated that in the assembly of family member B, the aperture 34 can be round since family member assembly B does not share the solenoid separator plate with any other family member assembly. The aperture 34 will be oval only for family members C and D which share a common solenoid separator plate. The solenoid separator plate of family member B utilizes the tab 28 and cannot be assembled into the assembly for family members C and D, since a tab 28 would interfere with the blocking surface 22 which is present on family member C and D.

Therefore, it should be appreciated from the above description that the interassembly of family members is impossible with the present structure, and accordingly, there will be not need of disassembly at final inspection and testing due to an improper valve body or separator plate being incorporated into a given transmission case.

The embodiments of the invention in which an exclusive property or privilege is claimed are defined as follows:

1. Alignment and assembly assisting means for establishing proper assembly of matched transmission components including a valve body and a transmission case in a transmission family having at least three family members, said assisting means comprising: first, second and third locating areas on said transmission case wherein a first family member has blocking structures on the first and second locating areas, a second family member has blocking structures on the first and third locating areas and a third family member has blocking structures on the second and third locating areas; first, second and third locating tabs areas disposed on a separator plate for alignment with said first, second and third locating areas on said transmission, the first family member having a tab at said third locating tab area, the second family member having a tab at said second locating tab area and the third family member having a tab at said first locating tab area; said separator plate also having first, second and third pin alignment areas, said first family member having pin openings in the second and third pin alignment areas, said second family member having a pin opening in said first pin alignment area and said third family member having a pin opening in said second pin alignment area; fourth, fifth and sixth pin alignment areas on the valve body alignable with the first, second and third pin alignment areas, respectively, on the separator plate and having selective pin openings therein for alignment of the respective family members on said separator plate; seventh, eighth and ninth pin alignment areas in a channel plate alignable with the first, second and third pin alignment areas, respectively, on said separator plate and having selective pin openings therein for alignment of the respective family members; and pin means for engaging the pin openings in the separator plate, valve body and channel plate for proper alignment thereof and cooperating with the tabs and blocking structures during assembly for preventing the intermixing of family member components into the transmission case.

2. Alignment and assembly assisting apparatus in combination with a transmission family having a least four family members; each family member having matched transmission components comprising a casing, at least one valve body, a channel plate and a separator plate; said alignment and assembly assisting apparatus comprising: blocking surface means disposed in locations distinct on the casing of each said family member; three locating tab means on each separator plate of each family member for limiting the installation of each separator plate to a given family member casing; apertures formed in the separator plate, channel plate and valve body and disposed in specific aligned locations distinct for each family member; and pin means disposed in the aligned aperture to ensure proper assembly of the separator plate, the channel plate and valve body for a given family member for assembly into the casing.

3. The alignment and assembly assisting apparatus defined in claim 2, further having a solenoid separator plate and a solenoid valve body in each family member and said solenoid separator plate having an aperture therein aligned with the apertures in the separator plate, channel plate and valve body and cooperating with the pin means to ensure proper assembly.

* * * * *